Nov. 16, 1943.  G. S. ALLIN  2,334,167
CABLE POWER UNIT
Filed June 20, 1941  3 Sheets-Sheet 1
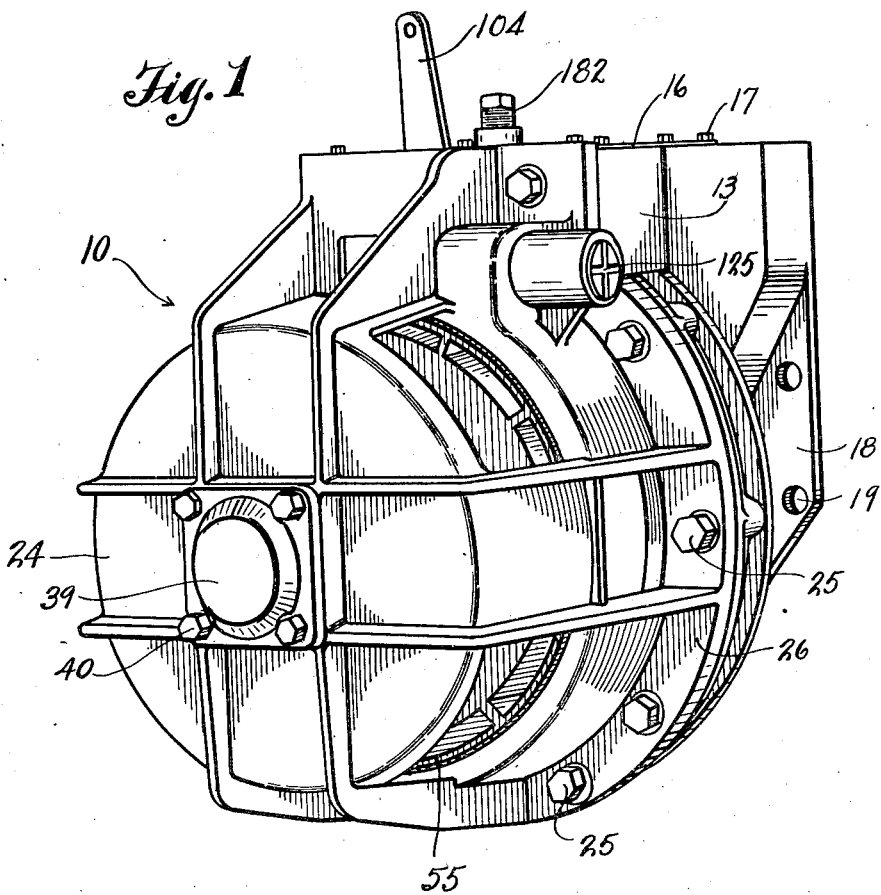
Fig. 1
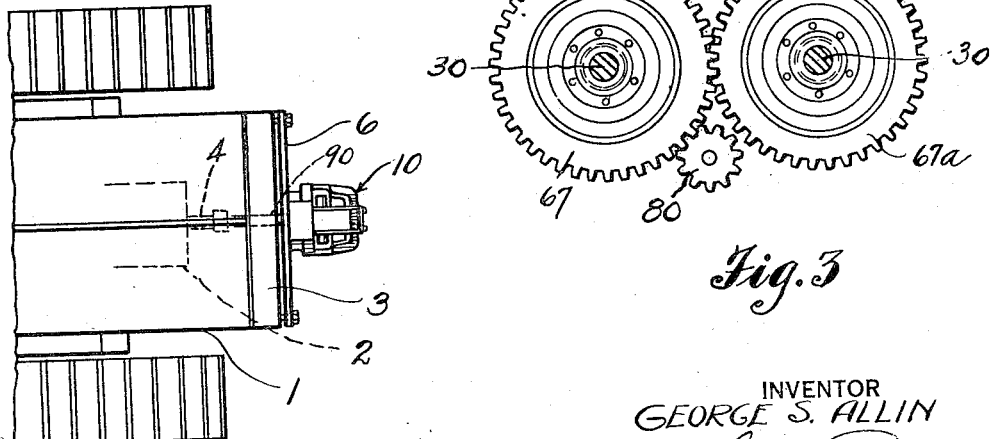
Fig. 2
Fig. 3
INVENTOR
GEORGE S. ALLIN
BY Cook & Robinson
ATTORNEY Nov. 16, 1943.    G. S. ALLIN    2,334,167
CABLE POWER UNIT
Filed June 20, 1941    3 Sheets-Sheet 2

INVENTOR
GEORGE S. ALLIN
BY
Cook & Robinson
ATTORNEY

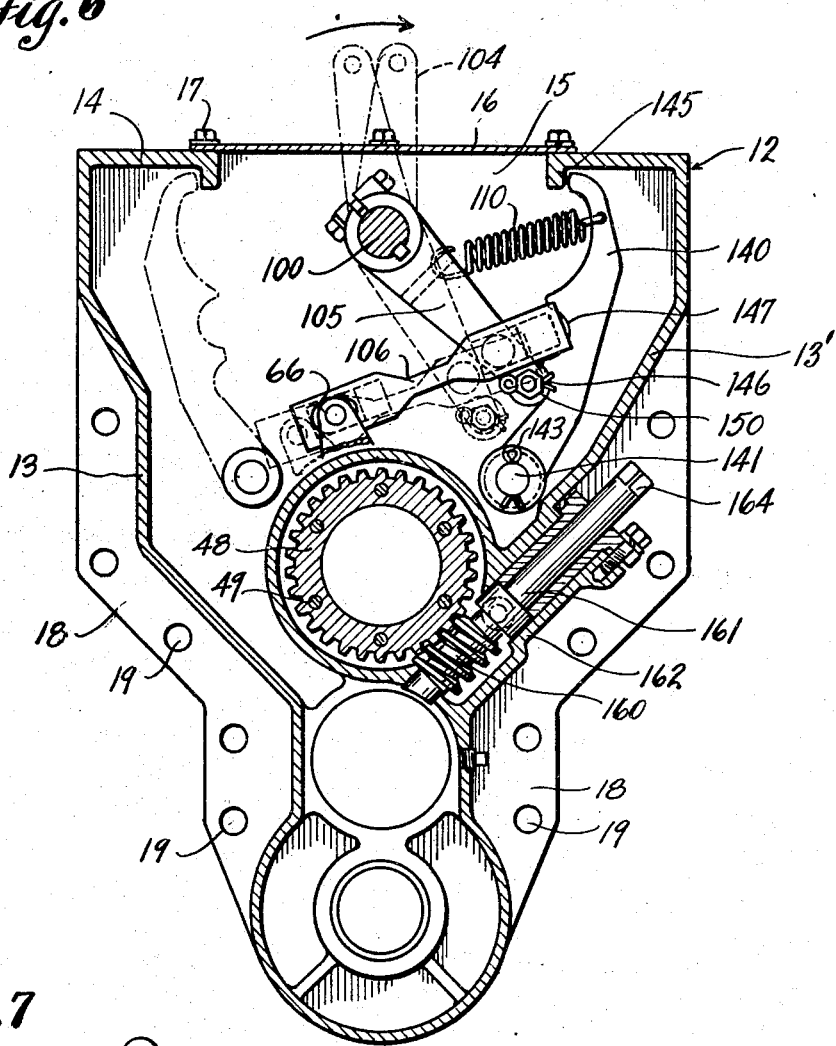

Patented Nov. 16, 1943

2,334,167

UNITED STATES PATENT OFFICE 2,334,167

CABLE POWER UNIT

George S. Allin, Seattle, Wash., assignor to Isaacson Iron Works, Seattle, Wash., a corporation of Washington Application June 20, 1941, Serial No. 398,872

9 Claims. (Cl. 254—187)

This invention relates to improvements in cable winding power units, and it has reference more particularly to power units of that character designed for functional mounting on tractors, or the like, for operation through a power take off connection with the tractor engine for the winding in and for controlled paying out of a cable.

In most friction driven winches and cable winding drums of this character, as now generally constructed, there are certain structural features that have proven faulty and objectionable in use, and which have resulted in short working life of the structure, besides causing difficulty in gaining access to the interior of the structure for repair, adjustment or replacement of parts.

In view of the above mentioned and other objectionable features which result in short working life, inefficiency in operation and difficulty of access, it has been the principal object of this invention to provide a power unit comprising improved details of construction whereby the above-mentioned faults are overcome and various advantages gained in a simplified and more practical structure.

It is also an object to provide a novel drive for a dual assembly of drums, wherein provision is made for driving the two drums in opposite directions, and for a reversal in the direction of the drums.

A further object of this invention is to provide a powered cable winding unit having parts that are reversible to adapt the drums to either right or left hand driving as conditions require.

Another object of the invention resides in the provision of novel means for effecting relative adjustments of the clutch elements as required to compensate for wear.

Still another object is to be found in the provision for operating the working parts in an oil bath, and in the novel arrangement of oil seals which prevent leakage of the lubricant from the housing to the friction clutch surfaces.

Still further objects of the invention reside in the details of construction and in the combination of parts as will hereinafter be fully described.

In accomplishing these and other objects of the invention, I have provided the improved details of construction, the preferred forms of which are illustrated in the accompanying drawings, wherein—

Fig. 1 is a perspective view of a cable power unit embodied by the present invention.

Fig. 2 is a partial plan view, in reduced scale, illustrating the mounting of the power unit on a tractor.

Fig. 3 is a detail illustrating the manner of arranging a reversible two drum unit and for driving its drums.

Fig. 6 is a vertical section on the line 6—6 in Fig. 4.

Fig. 7 is a vertical section in the line 7—7 in Fig. 4.

Figures 4, 5:
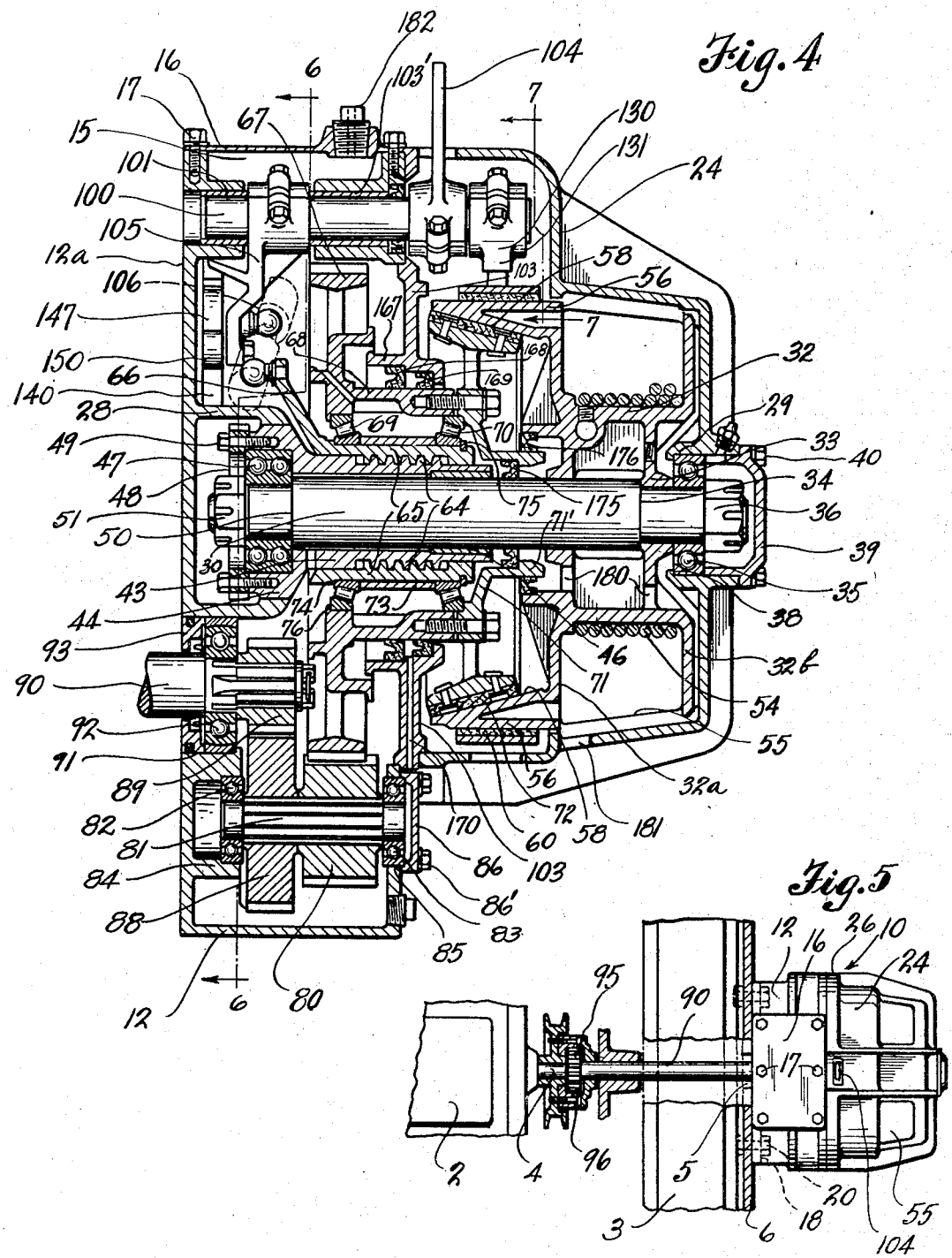
Fig. 4 is a vertical, sectional view of the present power unit taken in the plane of the drum axis.
Fig. 5 is a view diagrammatically illustrating the means for effecting a driving connection between the power take off shaft of the tractor engine and the present unit.

Referring more in detail to the drawings—

In Figs. 2 and 5 I have diagrammatically illustrated one of the ways in which the present cable power unit of single drum type may be operatively mounted upon a tractor of a common make of construction. In these views, 1 designates in general, the tractor, 2 designates the tractor engine and 3, the radiator forwardly of the engine.

Extending forwardly from the engine is a power take off shaft 4. This projects to a position close to but below the radiator and in alinement with an opening 5 in a vertically disposed adapter plate 6 which is rigidly fixed by bolts, or other suitable means, to the tractor frame and radiator, slightly forward of the latter. Mounted on the forward side of the adapter plate 6 is the present power unit, designated in its entirety by reference numeral 10.

In its present preferred form of construction, the single drum type of the cable power unit comprises an enclosing housing 12 having a flat base plate, or back wall 12a, opposite side walls 13—13' and a top wall 14. The top wall is formed with an opening 15 through which access may be had to the interior of the housing, and over this opening a removable closure plate 16 is held by bolts 17.

Portions of the base wall 12a extend beyond the side walls of the housing, as noted in Fig. 6 and thus provide attaching flanges 18 which are drilled, as at 19, for the reception of bolts 20, as in Fig. 5, whereby the unit may be functionally attached to the adapter plate 6.

If the unit is to be used at the rear end of the tractor, the flange openings 19 may be used there also for the reception of bolts to attach the housing to the tractor frame or to the transmission housing or tractor frame.

Removably applied to the open forward end of the housing 12, as formed by the base wall 12a, side walls 13—13' and top wall 14, is a closure 24, in the nature of a large cap. This is adapted to be fitted against the forward end of housing 12 and to be detachably secured by bolts 25, as noted in Fig. 1 which are extended through flanges 26 on the closure member and threaded into the flanged side walls of housing 12. This closure 24 is, in fact, a forward continuation of the housing 12, but is removable therefrom for assembly, repair or replacement of parts.

Formed within the housing 12 as an integral part of the base wall 12a, is a bearing housing 28, and likewise, formed within the closure member 24 on the outer end wall thereof, is a bearing housing 29. These housings 28 and 29 contain therein respectively the opposite end portions of a short shaft 30 which for convenience in explanation will be referred to as the drum shaft.

On the forward end portion of this shaft 30, a cable winding drum 32 is mounted, and this drum has a hub portion 33 that seats against a forwardly facing shoulder 34 on the shaft. At that end, the shaft is mounted revolubly in the housing 29 by a ball bearing assembly 35 having its inner raceway seated against the outer end of hub 33 and clamped thereagainst by a nut 36 that is threaded and locked on the shaft end. The outer raceway of this ball bearing assembly is fitted in the housing 29 and seated against an annular, outwardly facing shoulder 38 in the latter, and a cap 39 is applied over the open outer end of the housing 29 and this cap has a skirt portion fitted in the housing and engaging the outer raceway to retain the latter clamped against the shoulder 38. The cap is removably held in place by bolts 40.

The inner end of the drum shaft 30 is revolubly contained within a sleeve 43. This sleeve has an enlargement 44 at one end that is slidably fitted in the forward end of the bearing housing 28 for rotation as will be later described. At its forward end the sleeve 43 has a bushing 46 fitted therein, rotatably containing the shaft 30, and at its rearward end it has a rearwardly opening socket in which a ball bearing assembly 47 is contained to rotatably mount the drum shaft. The outer raceway of this assembly is clamped against the base of the socket by an overlying ring gear 48 through which anchor bolts 49 are extended and threaded into the sleeve base. The inner raceway of this assembly seats against a rearwardly facing shoulder 50 on the shaft and is clamped against this shoulder by a nut 51 that is threaded onto the shaft end and locked by a key. Thus the sleeve 43 is held against any possible longitudinal shifting on the shaft 30, and the shaft, by reason of its outer end support, is held against possible longitudinal shifting in the housing. The shaft 30 then becomes a mounting shaft for the cable winding drum 32.

The cable winding drum comprises spaced flanges 32a and 32b between which a cable, as indicated at 54, may be wound, and the cover section of the housing is formed at places registering between the drum flanges, with suitable openings 55 through which the cable is adapted to pass when being wound or paid out from the drums.

Formed integral with the inside flange 32a of the cable winding drum and concentric of shaft 30 is a brake drum 56 and the inside of this brake drum is formed with a conically tapered clutch surface 58. A brake band 60 is fitted about the brake drum flange and this, as presently described, is mounted by and acted on by means whereby it is caused to automatically grip and hold the drum 32 against turning in a reverse or unwinding direction.

Referring now to Fig. 4 it is to be observed that the shaft supporting sleeve 43 is formed with an exterior screw thread 64, and fitted about the sleeve and threaded thereto, is a cylindrical, clutch adjusting sleeve or nut 65, which is equipped at its rearward end with a radial lever arm 66 through the mediacy of which the sleeve or nut may be given rotative action in opposite directions for causing an endwise shifting thereof for setting or for releasing the drum driving clutch, as will presently be understood.

Revolubly supported about the clutch adjusting nut or sleeve 65 is a relatively large gear wheel 67. This wheel is formed with a cylindrical hub portion 68 which, within its opposite end portions, respectively, mounts roller bearing assemblies 69 and 70, through the mediacy of which this gear is free to revolve on its support.

Mounted on one end of the hub 68 is a disk 71 which mounts a cone clutch 72 adapted to engage and co-act with the conical surface 58 for driving the cable drum. This disk retains the two roller bearing assemblies in place, since it is to be noted that the inner raceways of the two bearings are definitely spaced by a spacing sleeve 73, and are seated, respectively, against an annular, outwardly facing shoulder, 74, and an annular key 75 applied to the mounting sleeve, while the outer raceways are seated, respectively, against a shoulder 76 in the gear and the clutch mounting disk 71. A feature of the bearing assembly is that the axial lines of the rollers of the two bearing assemblies converge toward centers away from the ends of the gear hub, instead of in the usual direction inwardly of the hub ends, thus when the clutch holding pressure is applied through the shifting of nut 65, there is not the tendency of the closer bearing to loosen up, as would be if the rollers of the bearings were set in an opposite manner.

The gear wheel 67 operates in mesh at its lower side with a driving pinion 80, splined on a short supporting shaft 81 carried in ball bearing assemblies 82 and 83 fitted about its opposite ends. Bearing assembly 82 is fitted within a housing 84 formed on the inside of plate 12a, and bearing assembly 83 is fitted in an opening 85 in a front wall portion of housing 12 below the closure section 24. A removable cover plate 86 is applied over the opening 85 and is secured by bolts 86' therethrough.

Also splined on the shaft 81 is a gear wheel 88 in mesh at its top side with a driving gear pinion 89, splined on the end of a short drive shaft 90 that extends through an opening 91 in the rear wall or base plate 12a, and has operative connection with the forward end of engine shaft 4. The shaft 90 is revolubly supported in the opening 91 by a ball bearing assembly 92 held in place by a sealing ring 93 fitted in the opening.

Referring now to Fig. 5, it will be noted that the rear end of shaft 90 is equipped with a fixed gear 95 which fits flexibly within an internally toothed hub 96 that is fixedly mounted on the end of the engine, power take off shaft 4. This provides the driving connection between shaft 4 and the power unit.

Revolubly mounted in the upper portion of the housing 12, parallel with and directly above the shaft 30, is a clutch and brake control shaft 100. This shaft is revolubly supported at one end in a bearing 101 on plate 12a, and at its other end is revoluble in a bearing 103' carried by an oil seal plate 103, that divides the housing between the inner and outer sections 12 and 24. Fixed on this shaft 100, at the forward side of plate 103, is an upwardly extended lever arm 104 for operative connection with controls for the manual control of the power unit, and fixed on the shaft, next to the bearing 101, is a downwardly and laterally directed arm 105, as seen in Fig. 6, which is connected by a link 106 with the sleeve rotating lever arm 66. Preferably the connection would comprise ball members on the lever arms and socket members associated with the link to contain the ball members partially therein.

Through the provision of this clutch connection the setting or releasing of the clutch may be controlled from the operator's position on the tractor by provision of suitable linkage extended to the outer end of lever 104. By actuating the lever arm 104 in the direction of the arrow adjacent thereto in Fig. 6, clutch adjusting nut or sleeve 65 will be rotated, and incident thereto will be shifted outwardly on sleeve 43 thus to shift the clutch cone 72 into engaging and driving contact with the conical clutch surface 58 and cause rotation of the cable winding drum 32. When pull on the lever 104 is relieved, a spring 110 attached to the lever arm 105, as seen in Fig. 6, pulls the setting lever back to normal position and this rotates the sleeve 65 in a manner to cause retraction of the clutch. Coincident with the release of the clutch, and any reverse turning of the cable drum, the brake band 60 automatically takes effect and holds the drum against any unwinding action.

Referring now to Fig. 7, it is there disclosed that one end of the brake band 60 is equipped with a lug 115 connected pivotally by a link 116 with a plug 117 that is adjustably threaded into an opening 118 that opens laterally from the top portion of the housing section 24. The other end of the brake band is equipped with a bracket 120 against which a coiled spring 121 presses to urge the band to grip the brake drum. The outer end of the spring is contained in a laterally opening passage 122, opposite to and alined with opening 121. A nut 125 is adjustably threaded into the outer end of passage 122 to sustain and adjust the holding pressure of the spring. With this arrangement of brake band and its mountings, any unwinding tendency of the cable drum will be automatically checked by the self-tightening action of the band, but when the brake drum is driven with the cable drum for winding in the cable, that is, when turning in the direction of the arrow in Fig. 7, the brake band automatically loosens itself, as is well understood in this art.

A feature of the present arrangement of parts is to be noted in the fact that the brake band and its mountings are carried in the removable cover section 24 of the housing and thus there is no difficulty or requirement for detachment of brake actuating parts in dismounting or removing this cover section.

In order that the brake band may be held released from the drum for paying out of the cable from the drum, when such is desired, a collar 130 is adjustably fitted to and clamped in the forward end of shaft 100, and on this collar is a downwardly extended lug 131, disposed adjacent the inside face of the bracket or shoe 120. By swinging the control lever arm 104 somewhat beyond the normal return position, as to the dotted line section in Fig. 7, the lug 131 will be caused to engage shoe 120 to counteract the pressure of spring 121 to move and hold the brake band released from the brake drum.

In connection with this arrangement of parts, a latch lever arm 140 is employed as noted in Fig. 6. The arm 140 is pivotally supported at its lower end from a stud 141 extended from the wall plate 12a and is held thereon by a key 143. The arm extends upwardly and is adapted to engage a stop 145 to limit its travel toward the shaft 100. The coiled spring 110 which returns the actuating lever 104 to neutral position after actuation is attached under tension to the upper end portion of this arm and holds it yieldably against outward swinging.

Formed in the side of the lever 40 are seats 146 and 147, and on the lower end of the lever arm is a roller 150. When it is desired that the brake band be held released from the brake drum for the free unwinding of the cable from the cable drum, the operator actuates the lever arm 104 toward the dotted line position in Fig. 7. This causes the shaft 100 to be rotated in such direction that the lug 131 engages bracket 120 and moves the brake against the holding pressure of spring 121 to release the brake, for free turning of the cable drum. If it is desired to hold the brake in this released position, the lever 105 is actuated to such extent that the roller 150 moves past seat 146 into seat 147 where it will be yieldingly retained due to the pull on lever 140 that is exerted by the spring 110.

In order that the position of the clutch head 72 may be accurately adjusted for correct position, and also to compensate for wear on the friction surfaces, I provide for effecting rotative adjustments of the threaded sleeve 43; it being understood that, if considering the nut 65 to be held against rotation, any rotative adjustment of the sleeve 43 will adjust the clutch head 62 accordingly. As will be noted in Fig. 6, the ring gear 48 which is bolted to the outer end of the sleeve 43 meshes with a worm gear 160 fixed on a shaft 161 mounted in a bearing 162 in a side wall 13 of the housing. The outer end of the shaft has a wrench head 164 exteriorly of the housing 12 whereby it may be rotated for adjustment of the ring gear and sleeve 43. Thus, through this means, the desired setting of the clutch for operation or to compensate for wear may be easily and readily made from the outside of the housing.

Referring now to the facilities for containing the driving gears 2 in a lubricant and for sealing the housing 12 against any seepage of lubricant therefrom to the clutch surfaces. It will be observed that the plate 103 is applied between the housings 12 and 24 as a dividing partition and that it is formed with a hub portion 167 through which the hub portion 68 of the gear 67 is rotatably extended. Applied within the hub opening are two oil sealing rings 168—169 in spaced relationship as a double insurance against leakage. Leading from the lower portion of the space between the sealing rings, down through the plate 103, is a drain channel 170 that opens to the outside of the housing. This channel affords escape to the outside of the housing of oil that might pass the first sealing ring.

Likewise there is an oil sealing ring 175 applied about shaft 30 within a hub portion 71' of the clutch mounting plate 71 and there is another sealing ring 176 applied about this hub portion 71' and internally of the hub portion of the cable winding drum. Any seepage that might pass the seal 175 into the drum hub will drain through passages 180 in the drum hub to the outside of the drum at the outer end thereof and can drain from the housing 24 through bottom openings as at 181.

It is anticipated that the mechanism in the housing 12 shall operate in oil, and therefore the cover plate 16 is equipped with an oiling opening normally closed by a plug 182.

In the use of a dual arrangement of power cable winding units of this character, where it is desired that the cable drums be driven in opposite directions and where it is desired also that provision be made for reversing the direction of driving the drums, the two units, alike in construction, except as hereinafter noted, would properly be mounted in a housing common to both and the driving gear wheels be located in the same vertical plane and spaced just sufficient for clearance. The arrangement of the two driving gears would be as indicated in Fig. 3, wherein 67 and 67a designate the driving gears for the two units, respectively. In this particular dual arrangement of power units, the gear wheels 67 and 67a would be of unequal diameter, such, for example, in the proportions indicated in Fig. 3, and the driving gear pinion 80 would be arranged in driving mesh with the larger gear wheel. Also, the pinion 80 would be equally spaced or centered relative to the axes of the two gear wheels. Therefore, the driving connection provides that by reversal of the gear wheels as associated with the two cable drums, the direction of drive of each is reversed and also, that the drums will be driven in opposite directions.

A particular advantage is to be noted in the present arrangement of parts for easy accessability in case of repair or replacement of parts. To gain access to the interior it is only necessary to remove cap 39, nut 36 and the bolts 25 for removal of the outer section 24. When this outer, cap section is withdrawn, it carries with it, the brake band and its mountings. The cable drum can then be withdrawn from the outer end of shaft 30, giving access to the clutch elements. Then if it is desired to enter the oil sealed casing, the partition plate 103 is detached from housing 12 and lifted out and this carries with it the shaft 30 and the sleeves 43, 65 and gear 67; it being understood that link 106 is detached from lever arm 66 through the top opening 15.

There are outstanding advantages in the solid or fixed mounting of the drum on shaft 30 and the support of the shaft at its ends. First, this provides a mounting that eliminates any possible wobbling of the drum, and it also overcomes the loosening of bearings, that is incident to heat and which is so noticeable and objectionable in drums that are mounted directly on hub contained bearings.

The relatively wide spacing of the bearings in the hub of the driving gear wheel 67 is also advantageous from the standpoint of overcoming wobble incident to looseness that results from wear and overheating, and the provision of the oil sealed compartment for the gearing is exceedingly desirable and its advantages readily apparent.

Having thus described the invention, what is claimed as new therein and on which it is desired to secure Letters Patent is:

1. A cable power unit comprising a revolubly mounted shaft, a cable winding drum fixed thereon, a fixedly mounted, exteriorly threaded sleeve disposed coaxially about the shaft, a second sleeve threaded onto the first mentioned sleeve and adapted for rotative adjustment thereon in opposite directions, a driven gear wheel mounted to freely revolve on the second mentioned sleeve and to be shifted by and in accordance with the axial shifting of the sleeve that is incident to rotative adjustments thereof, complemental clutch elements on the gear and drum respectively, and means for rotatably adjusting the second mentioned sleeve to functionally engage or disengage the clutch elements.

2. A cable power unit comprising a housing, a shaft contained in the housing and revolubly supported at its ends, a cable winding drum fixed on the shaft, an exteriorly threaded sleeve, applied about the shaft beyond one end of the drum and revolubly containing the shaft therein, means for normally holding the said sleeve against rotation and endwise shifting relative to the shaft, a second sleeve threaded onto the first mentioned sleeve and adapted to be rotatably adjusted in opposite directions thereon to effect endwise shifting thereof, a driven gear wheel mounted to revolve on the second mentioned sleeve and to be shifted in its axial direction in accordance with axial shifting of the rotatably adjustable sleeve, complemental clutch elements on the gear wheel and drum respectively and means for rotatably adjusting the second mentioned sleeve in opposite directions to shift the gear wheel to functionally engage or to disengage the clutch elements.

3. A cable power unit comprising a housing, a shaft contained therein, a cable winding drum fixed on the shaft, means in the housing revolubly supporting the shaft at one end, an externally threaded sleeve applied about the shaft beyond the other end of the drum and revolubly containing the shaft therein, said sleeve being mounted in the housing for the functional support of the shaft, means normally holding the said sleeve against rotation, a second sleeve applied about and threaded onto the first mentioned sleeve, a driven gear wheel mounted on and revoluble about the second sleeve, complemental clutch elements carried by the gear and drum respectively and means for rotatably adjusting the second sleeve in opposite directions to functionally engage or to disengage the clutch elements.

4. A cable power unit, comprising a revolubly mounted shaft, a cable winding drum fixed thereon, a normally stationary, externally threaded sleeve disposed coaxially about the shaft and held thereon against relative longitudinal movement, a second sleeve threaded on said first mentioned sleeve and rotatably adjustable in opposite directions, a driven gear wheel mounted to revolve freely on the second mentioned sleeve and held against relative axial movement thereon, complemental clutch elements on the gear and drum respectively, means for rotatably adjusting the second mentioned sleeve to engage or disengage the clutch elements, and for holding it at its different positions of adjustment, and means for rotatably adjusting the first mentioned sleeve while the second sleeve is held against rotation to effect an adjustment in setting of the clutch elements.

5. A cable power unit comprising a housing, a shaft revolubly supported in the housing, a cable winding drum fixed on the shaft, a bearing revolubly supporting the shaft at one end and holding it against longitudinal shifting, an externally threaded sleeve applied about the shaft at its other end, and revolubly containing the shaft therein, means for retaining the said sleeve against longitudinal movement on the shaft; said sleeve being rotatably mounted in the housing for the functional support of that end of the shaft, a second sleeve applied about and having a threaded connection with the first mentioned sleeve and rotatably adjustable in opposite directions thereon, a driven gear revolubly mounted about the second sleeve and shiftable in its axial direction with the shifting of the sleeve, complemental clutch elements respectively on the gear wheel and drum, means for rotatably adjusting the second sleeve to effect an endwise shifting thereof, for the functional engagement or disengagement of the clutch elements, a gear wheel mounted on the first mentioned sleeve and means operable from outside the housing for rotatably adjusting said gear and for holding it in different positions of adjustments whereby to effect an adjustment in setting of the clutch elements.

6. A cable power unit comprising a housing formed with inner and outer bearings in spaced alinement, a partition wall dividing the housing between the bearings and providing an oil sealed compartment at the inside thereof, and having an opening therein alined with the bearings, a shaft extending through said partition wall opening and located at its ends in said bearings, antifriction means rotatably fixing one end of said shaft in the outer bearing, a sleeve revolubly containing the inner portion of the shaft therein and slidingly and rotatably supported in the inner bearing, anti-friction means within the sleeve and having a fixed connection therewith and with the shaft for holding the sleeve against longitudinal shifting on the shaft, a second sleeve enclosing and having a screw threaded connection with the first mentioned sleeve, a driving gear wheel revolubly mounted upon the second mentioned sleeve and having a hub portion extended through said partition wall opening to the outside thereof, means sealing the opening about the said hub, a cable winding drum fixed on the shaft at the outside of the partition wall, complemental clutch elements on the drum and gear hub, and means at the inside of the partition wall for effecting rotative adjustment of the second mentioned sleeve to shift the gear wheel axially to functionally engage or disengage the clutch elements, and means adjustable from outside the housing for effecting rotative adjustment of the first mentioned sleeve while the second mentioned sleeve is held against rotation to adjust the setting of the clutch elements.

7. A cable power unit comprising a housing, a revolubly mounted shaft in the housing, a cable winding drum fixed on the shaft, a driven gear wheel revoluble about the shaft and shiftable longitudinally thereon, complemental clutch elements mounted by the gear and drum respectively, a brake for the drum normally holding it against unwinding and automatically releasable when the drum is rotated for winding the cable thereon, a manually operable control shaft rotatably supported in the housing, a lever arm fixed to the shaft, means operable by said lever arm, incident to rotative adjustment of the control shaft in opposite directions, to effect the shifting of the gear wheel for engagement and disengagement of the clutch elements, and means on the said shaft for effecting a controlled braking action while the clutch elements are disengaged.

8. A cable power unit comprising a housing, a revolubly mounted shaft in the housing, a cable winding drum fixed on the shaft, a driven gear wheel revoluble about the shaft and shiftable longitudinally thereon, complemental clutch elements on the gear and drum respectively, adapted to be engaged and disengaged by the shifting of the gear in opposite directions, a brake normally operable to hold the drum against unwinding, and automatically releasable incident to rotation of the drum in a direction for winding of the cable thereon, a manually operable control shaft rotatably supported in the housing, a lever arm fixed to the control shaft, means connected to said lever arm and operable upon rotation of the control shaft in one direction, for shifting the gear wheel to engage the clutch elements, and upon rotation of the shaft in the opposite direction, to disengage the clutch elements, means on the control shaft for effecting the release of the brake incident to rotation of the control shaft beyond the normal clutch release position and a yieldable latch means disposed to holdingly engage the lever arm when the latter is moved beyond the normal clutch release position, to retain the brake released.

9. A cable power unit as recited in claim 8 wherein the said yieldable latch means comprises a pivotally mounted lever arm, a spring connecting the said latch lever arm and the lever arm of the control shaft to draw the latter to its normal clutch releasing position; said latch lever arm having a stop shoulder adapted to be engaged to determine the normal clutch release position of the lever arm, and having a recess into which said lever may be shifted by movement beyond the normal clutch release position to retain the brake released.

GEORGE S. ALLIN.